US012668115B2

(12) United States Patent
Braig et al.

(10) Patent No.: US 12,668,115 B2
(45) Date of Patent: Jun. 30, 2026

(54) WASHER FOR AN ELECTRICAL ENERGY STORE, ELECTRICAL ENERGY STORE, ARRANGEMENT AND MOTOR VEHICLE

(71) Applicant: Bayerische Motoren Werke Aktiengesellschaft, Munich (DE)

(72) Inventors: Matthias Braig, Unterhaching (DE); Markus Poetzinger, Munich (DE); Philip Raettich, Stoettwang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 18/685,015

(22) PCT Filed: Aug. 10, 2022

(86) PCT No.: PCT/EP2022/072396
§ 371 (c)(1),
(2) Date: Feb. 20, 2024

(87) PCT Pub. No.: WO2023/041256
PCT Pub. Date: Mar. 23, 2023

(65) Prior Publication Data
US 2025/0128590 A1 Apr. 24, 2025

(30) Foreign Application Priority Data

Sep. 17, 2021 (DE) ...................... 10 2021 124 154.5

(51) Int. Cl.
B60K 6/28 (2007.10)
F01N 13/18 (2010.01)
(Continued)

(52) U.S. Cl.
CPC ............ B60K 6/28 (2013.01); F01N 13/1805 (2013.01); F16B 43/001 (2013.01);
(Continued)

(58) Field of Classification Search
CPC .... B60K 6/28; H01M 50/249; H01M 50/262; H01M 50/224; H01M 50/204;
(Continued)

(56) References Cited

U.S. PATENT DOCUMENTS 8,454,290 B2 * 6/2013 Schaser ................... F16F 1/328
411/902
11,563,252 B2 * 1/2023 Masaryk ................ B60L 50/64
(Continued)

FOREIGN PATENT DOCUMENTS

DE 10 2012 211 180 A1 4/2014

OTHER PUBLICATIONS

International Search Report (PCT/ISA/210) issued in PCT Application No. PCT/EP2022/072396 dated Dec. 7, 2022, with English translation (4 pages).
(Continued)

*Primary Examiner* — Huan Le
(74) *Attorney, Agent, or Firm* — Crowell & Moring LLP

(57) ABSTRACT

A washer to be arranged in a mechanical connection between an energy storage module and a housing of an electrical energy store for a motor vehicle includes an axial hole for receiving a connector and axially opposing bearing surfaces for pressing against metal contact surfaces of the energy storage module and the housing. The washer has a metal bushing for providing a current path between the contact surfaces for potential equalization between the energy storage module and the housing, the axially opposing faces of the bushing forming the bearing surfaces. The bushing has, between the faces, a tapering cross section forming a fuse for interrupting the current path in the event of overcurrent. A thermally insulating material surrounds the metal bushing at least in the region of the tapering cross section and compensates for the tapering cross section in
(Continued)

order to provide a substantially constant outer diameter of the washer and to reduce the thermal conductivity of a heat-conducting path formed by the washer between the housing and the energy storage module.

12 Claims, 3 Drawing Sheets

(51) Int. Cl.

| | |
|---|---|
| *F16B 43/00* | (2006.01) |
| *H01M 50/204* | (2021.01) |
| *H01M 50/224* | (2021.01) |
| *H01M 50/249* | (2021.01) |
| *H01M 50/262* | (2021.01) |
| *H01M 50/583* | (2021.01) |

(52) U.S. Cl.
CPC ....... *H01M 50/204* (2021.01); *H01M 50/224* (2021.01); *H01M 50/249* (2021.01); *H01M 50/262* (2021.01); *H01M 50/583* (2021.01); *H01M 2200/103* (2013.01); *H01M 2220/20* (2013.01)

(58) Field of Classification Search
CPC ......... H01M 50/583; H01M 2200/103; H01M 2220/20; F16B 43/001
See application file for complete search history.

(56) References Cited

U.S. PATENT DOCUMENTS

| | | | |
|---|---|---|---|
| 2015/0033497 A1 | 2/2015 | Puri et al. | |
| 2015/0044544 A1 | 2/2015 | Idikurt et al. | |
| 2017/0237113 A1* | 8/2017 | Ruehle | H01M 10/0585 |
| | | | 429/186 |
| 2018/0058494 A1 | 3/2018 | Fujihara et al. | |
| 2020/0144569 A1 | 5/2020 | Zheng et al. | |
| 2021/0054870 A1 | 2/2021 | Su | |

OTHER PUBLICATIONS

German-language Written Opinion (PCT/ISA/237) issued in PCT Application No. PCT/EP2022/072396 dated Dec. 7, 2022, with English translation (9 pages).
German-language Search Report issued in German Application No. 10 2021 124 154.5 dated Jun. 24, 2022, with partial English translation (13 pages).

* cited by examiner

WASHER FOR AN ELECTRICAL ENERGY STORE, ELECTRICAL ENERGY STORE, ARRANGEMENT AND MOTOR VEHICLE

BACKGROUND AND SUMMARY

The invention relates to a washer to be arranged in a mechanical connection between an energy storage module and a housing of an electrical energy store for a motor vehicle, wherein the washer has an axial hole for receiving a connector of the mechanical connection and axially opposite abutment surfaces for pressing against metallic contact surfaces of the energy storage module and of the housing. The invention also relates to an electrical energy store, to an arrangement composed of an electrical energy store and a heat source, and to a motor vehicle comprising such an arrangement.

In the present case, interest is directed to electrical energy stores which can be used for electrified motor vehicles, in particular for hybrid vehicles. Hybrid vehicles usually have an electric machine supplied by the electrical energy store and an internal combustion engine. The electrical energy store has a housing in which at least one energy storage module is arranged and held. To this end, it is for example possible for a cell module frame of the energy storage module to be mechanically connected, for example by way of screws, to the housing. The mechanical connection may comprise a metallic washer with axially opposite abutment surfaces for pressing against the cell module frame, and the housing which is designed to take up an operating load of the mechanical connection, in particular screw-related compressive forces and friction forces. A metallic washer exhibits good settling behavior, a high permissible surface pressure and high robustness. Furthermore, a flow of current for potential equalization between the energy storage module and the housing can take place via such a metallic washer.

However, metallic washers also exhibit good thermal conductivity. This can be disadvantageous if a heat source, for example an exhaust-gas system of the motor vehicle in the form of a hybrid vehicle, is located in the vicinity of the housing. A heat input from the exhaust-gas system can result in a temperature gradient within the energy storage module, which can have a negative effect on operation and on a service life of energy storage cells of the energy storage module. In order to prevent this, the washers can be formed from a thermally insulating material, for example a ceramic, which exhibit poorer settling behavior, a lower permissible surface pressure and lower robustness than a metallic washer. Furthermore, such a thermally insulating material is also electrically insulating, and therefore it is not possible to provide potential equalization.

It is the object of the present invention to provide a washer for an electrical energy store of a motor vehicle that is improved in comparison with the prior art.

This object is achieved according to the invention by means of a washer, an electrical energy store, an arrangement and a motor vehicle having the features according to the respective independent patent claims. The dependent patent claims, the description and the figures provide advantageous embodiments of the invention.

A washer according to the invention is used for arrangement in a mechanical connection between an energy storage module and a housing of an electrical energy store for a motor vehicle. The washer has an axial hole for receiving a connector of the mechanical connection and axially opposite abutment surfaces for pressing against metallic contact surfaces of the energy storage module and of the housing.

The washer also comprises a metallic bushing for providing a current path between the contact surfaces for potential equalization between the energy storage module and the housing. Axially opposite end faces of the metallic bushing form the abutment surfaces. The bushing also has, between the end faces, a cross-sectional tapering, which forms a fuse, for interrupting the current path in the event of an overcurrent. The washer further comprises a thermally insulating material, which surrounds the metallic bushing at least in the region of the cross-sectional tapering and which compensates for the cross-sectional tapering, for providing a substantially constant outer diameter of the washer and reducing a thermal conductivity of a heat-conducting path, formed via the washer, between the housing and the energy storage module.

The invention also concerns an electrical energy store for a motor vehicle, comprising at least one energy storage module, a housing for receiving the at least one energy storage module, at least one connecting means for providing a mechanical connection between metallic contact surfaces of the at least one energy storage module and of the housing, and at least one washer according to the invention. The invention also relates to an arrangement for a motor vehicle, in particular a hybrid vehicle, comprising at least one electrical energy store and a heat source. In the installed state in the motor vehicle, the electrical energy store may be arranged in the vicinity of the heat source, in particular an exhaust-gas system of the motor vehicle which is powered by combustion engine and electrically. To this end, the housing may, for example, have a double-shell lower part and a housing cover, such that two interconnected housing regions can be formed. At least one energy storage module can be arranged in each of the housing regions. A channel which extends in a vehicle longitudinal direction and through which a pipe of the exhaust-gas system runs may be formed between the housing regions, in particular between the two shells of the lower part and the housing cover. As a result of the exhaust gas flowing in this pipe, an undesired heat input into the electrical energy store may take place.

The at least one energy storage module may have a plurality of energy storage cells, for example prismatic battery cells, which can be held by a cell module frame. The energy storage module may be mechanically connected to the at least partially metallic housing by way of the at least partially metallic cell module frame. To this end, the cell module frame and the housing have contact regions with smooth, planar contact surfaces against which the abutment surfaces of the washer can be placed and pressed. The washer is thus arranged between the contact surface of the energy storage module and the contact surface of the housing and clamped or pressed therein by way of a connector. The connector is in particular a screw, such that the mechanical connection is a screw connection. To hold the screw, the contact region of the energy storage module and the washer have passage bores or holes through which a shank of the screw is guided. A screw head of the screw bears against a side of the contact region of the energy storage module, said side being opposite the contact surface. The contact region of the housing may have a screw hole with a thread for tightening the screw. As an alternative thereto, the contact region of the housing may also have a passage bore, such that the screw is secured on a side of the contact region of the housing, said side being opposite the contact surface, by means of a nut.

According to the invention, the washer then performs a plurality of functions. The washer provides a robust mechanical connection having a high permitted surface pressure and good settling behavior between the housing and the energy storage module. The washer also reduces a heat input into the energy storage module. Furthermore, the washer provides a current-conducting connection between the energy storage module and the housing for potential equalization. In addition, the washer functions as an over-current protection device, in order to prevent an overcurrent flow between the energy storage module and the housing. Such an overcurrent may, for example, be a short-circuit current propagating through the energy storage module, for example as a result of thermal runaway of an energy storage cell. The washer is thus in the form of a thermal insulating disk with integrated short-circuit fuse.

To perform these functions, the, in particular hollow-cylindrical, washer is composed of two regions of different material. The first region is formed by the metallic bushing which has the hole for receiving the connecting means and the metallic end faces of which form the abutment surfaces of the washer. The metallic part of the washer is thus embodied such that it offers a smooth, areal support at the contact surfaces with respect to the clamping partners, that is to say the housing and the cell module frame. Due to the fact that the abutment surfaces are metallic, they are par-ticularly robust and can reliably take up the operating load of the clamping partners. In this case, the metallic bushing extends over an entire thickness or axial height of the washer, such that the current path between the cell module frame and the housing for potential equalization can be formed.

To form an overcurrent protection device in the form of a fuse, the bushing has the cross-sectional tapering or cross-sectional reduction which is fusible in the event of overcur-rent. To this end, a cross section of the bushing is smaller in the region of the cross-sectional tapering than in the region of the end faces. In other words, between the two abutment surfaces, the cross section is reduced to such an extent that only a residual cross section designed for the overcurrent or short-circuit current remains. The design of the residual cross section can be specifically adapted to the electrical energy store and the short-circuit currents occurring there so that this residual cross section melts when the short-circuit current is flowing and interrupts the short-circuit current path from the energy storage module to the housing. The cross-sectional tapering thus forms a predetermined break-ing point in the event of an overcurrent, which electrically separates the two abutment surfaces and thus the metallic contact surfaces in the event of a fault.

To stabilize the washer in the region of the cross-sectional tapering, the washer comprises the thermally insulating material, for example a glass-fiber-reinforced thermoset, which forms the second region of the washer. The thermally insulating material fills the residual cross section in the region of the tapering of the metallic bushing at least to such an extent that the cross section of the washer in the region of the tapering corresponds to the cross section in the region of the end faces and thus the hollow-cylindrical shape of the washer is formed. The outer diameter is thus substantially constant over the axial height of the washer. As a result of this thermally insulating sheath, the washer is able to con-tinue to support the mechanical operating load even when the fuse is triggered, i.e. when the cross-sectional tapering melts. The thermally insulating material also reduces the thermal conductivity of the washer and thus reduces the heat input from the heat source arranged outside the housing into the energy storage module.

In this case, provision may be made for the metallic bushing to have two plate-like end pieces, the surfaces of which form the metallic end faces and which are connected by way of the cross-sectional tapering, wherein the ther-mally insulating material is arranged between the plate-like end pieces and surrounds the cross-sectional tapering. The bushing is thus in the form of a perforated, metallic core, the opposite end pieces of which are of plate-like form. The cross-sectional tapering is arranged between the end pieces and is for example in the form of a web of constant thickness. However, the cross-sectional tapering is prefer-ably of double cone form. The bushing is thus of substan-tially hourglass form.

The invention also relates to a motor vehicle comprising an arrangement according to the invention. The motor vehicle is in particular in the form of a hybrid vehicle and comprises an electric machine, an internal combustion engine, an exhaust-gas system functioning as a heat source, and the electrical energy store according to the invention.

The embodiments presented with regard to the washer according to the invention, and the advantages thereof, apply correspondingly to the electrical energy store according to the invention, to the arrangement according to the invention and to the motor vehicle according to the invention.

Further features of the invention will emerge from the claims, from the figures and from the description of the figures. The features and feature combinations mentioned above in the description, and the features and feature com-binations mentioned below in the description of the figures and/or shown only in the figures, may be used not only in the respectively specified combination but also in other combi-nations or individually.

The invention will now be discussed in more detail on the basis of a preferred exemplary embodiment and with refer-ence to the drawings.

In the figures, identical and functionally identical ele-ments are denoted by the same reference designations.

DETAILED DESCRIPTION OF THE DRAWINGS

Figure 1:
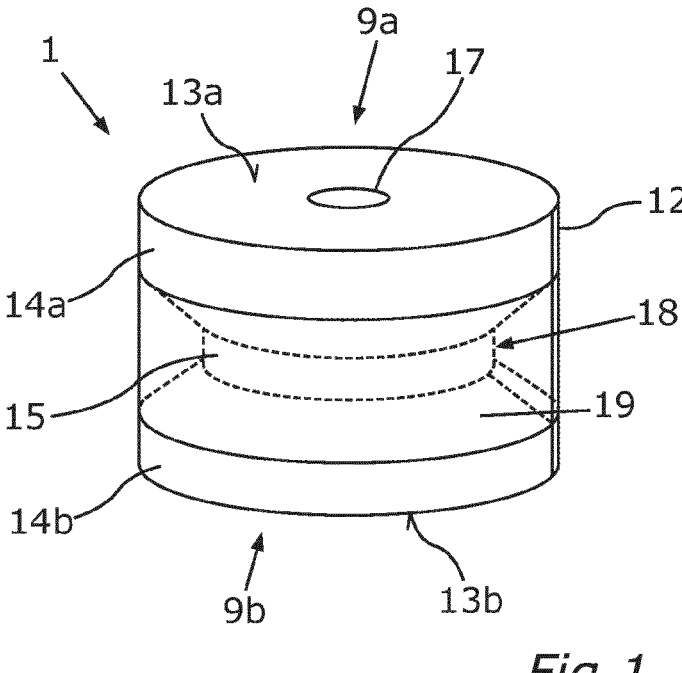
FIG. 1 is a perspective illustration of a washer for an electrical energy store.
Figure 2:
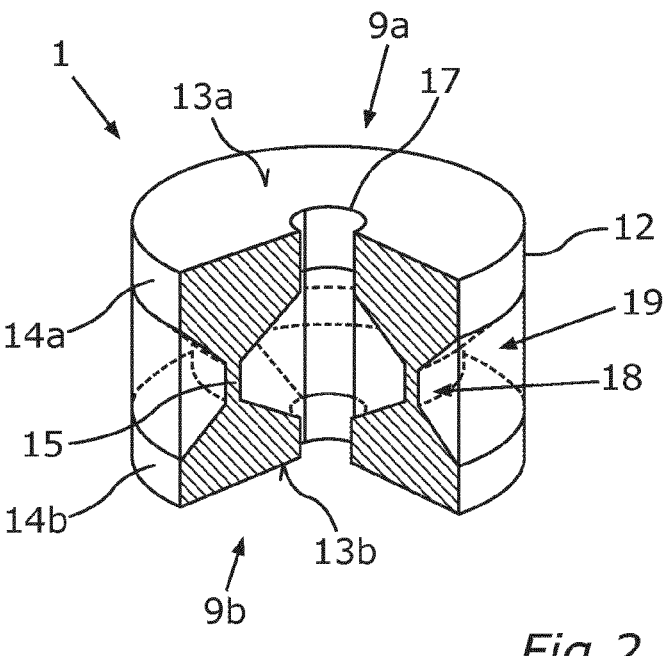
FIG. 2 is a sectional perspective illustration of the washer according to FIG. 1.
Figure 3:
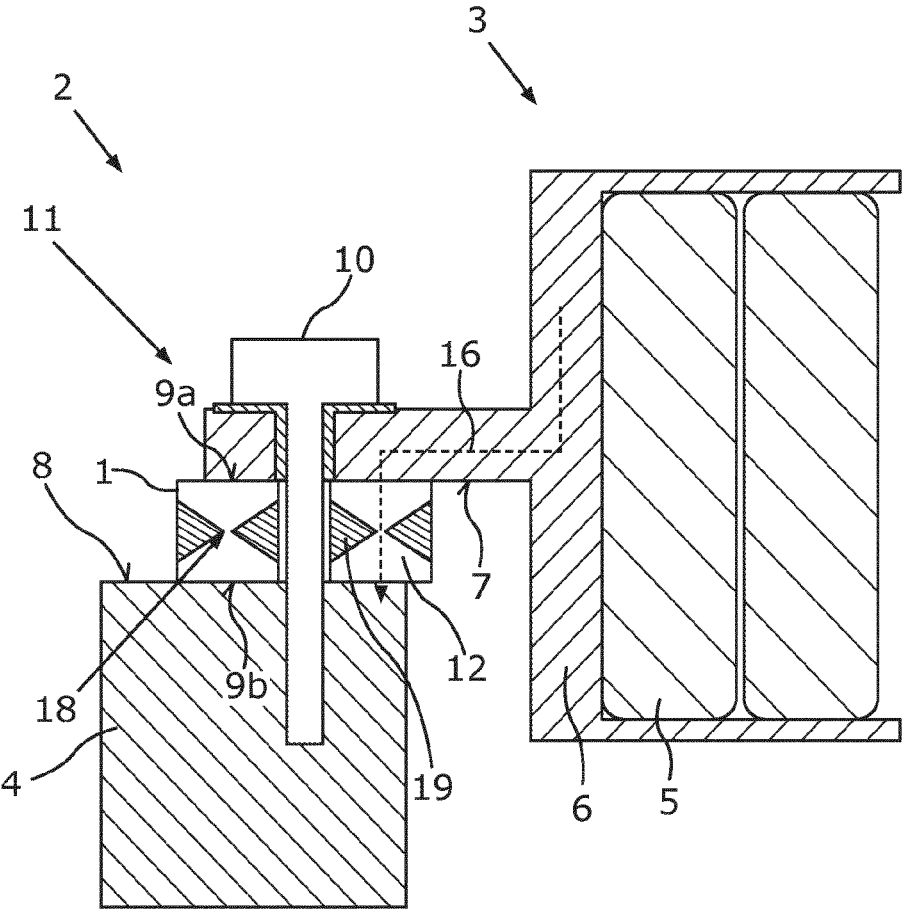
FIG. 3 is a schematic sectional illustration of a detail of the electrical energy store with the washer.
Figure 4:
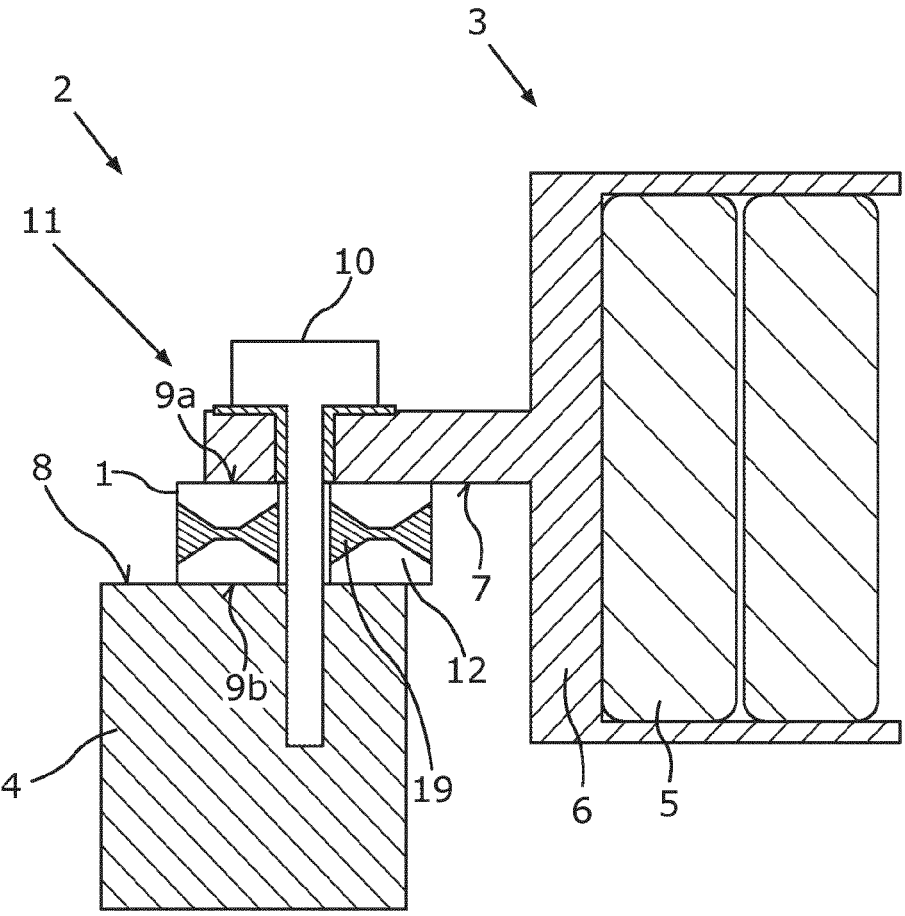
FIG. 4 shows the electrical energy store according to FIG. 3 with the washer after an overflow current.

FIG. 1 and FIG. 2 show a washer 1 for an electrical energy store 2, details of which are shown in FIG. 3 and FIG. 4. The electrical energy store 2 can be used for a motor vehicle, in particular a hybrid vehicle. The electrical energy store 2 has an energy storage module 3 and a housing 4. The energy storage module 3 has a plurality of energy storage cells 5 which are stacked against one another and which are held by a cell module frame 6. The energy storage module 3 arranged within the housing 4 is fastened to the housing 4. To this end, the energy storage module 3 has a first contact surface 7 and the housing 4 has a second contact surface 8. The contact surfaces 7, 8 are metallic. The washer 1 is arranged between the contact surfaces 7, 8 in such a way that abutment surfaces 9a, 9b of the washer 1 bear against the contact surfaces 7, 8. The cell module frame 6 and the housing 4 are connected by way of a connector 10 in the form of a screw so as to form a mechanical connection 11 in the form of a screw connection, which is guided through the contact surfaces 7, 8 and the washer 1. The screw 10 clamps the washer 1 between the contact surfaces 7, 8.

The washer 1 has a metallic bushing 12, the axially opposite, metallic end faces 13*a*, 13*b* of which form the abutment surfaces 9*a*, 9*b*. Here, the opposite end faces 13*a*, 13*b* are surfaces of plate-shaped end pieces 14*a*, 14*b* of the metallic bushing 12. The metallic bushing 12 also has a cross-sectional tapering 15 connecting the end pieces 14*a*, 14*b*. By way of the plate-shaped end pieces 14*a*, 14*b* and the cross-sectional tapering 15, which is of double cone form here, a current path 16 between the cell module frame 6 and the housing 4 can be formed and can be used to carry out potential equalization between the energy storage module 3 and the housing 4. The bushing 12 also has an axial hole 17 for receiving a shank of the screw 10. The cross-sectional tapering 15 forms a fuse 18 which, when an overcurrent flows via the washer 1, melts and thus interrupts the current path 16. FIG. 4 shows the washer 1 after the fuse 18 has been triggered. There, the abutment surfaces 9*a*, 9*b* and thus the energy storage module 3 and the housing 4 are electrically separated.

In order for the mechanical properties of the washer 1 to not be impaired by the cross-sectional reduction 15, a pressure-resistant, thermally insulating material 19, for example a thermoset, is used, which supplements the cross section of the washer 1. The take-up of connecting forces of the screw connection 11 can thus also be ensured after the fuse 18 has been triggered. The thermally insulating material also reduces a thermal conductivity of the washer 1, and therefore a heat input from a heat source outside the housing 4 via the washer 1 into the energy storage module 3 can at least be reduced.

What is claimed is:

1. A washer to be arranged in a mechanical connection between an energy storage module and a housing of an electrical energy store for a motor vehicle, the washer comprising:
   a metallic bushing for providing a current path between axially opposite abutment surfaces of the metallic bushing for pressing against metallic contact surfaces of the energy storage module and the housing for potential equalization between the energy storage module and the housing, wherein
      metallic axially opposite end faces of said metallic bushing form the axially opposite abutment surfaces,
      the metallic bushing has, between the axially opposite end faces, a cross-sectional tapering, which tapering forms a fuse for interrupting a current path in an event of an overcurrent, and
      the metallic bushing has an axial hole for receiving a connector of the mechanical connection; and
   a thermally insulating material surrounding the metallic bushing at least in a region of the cross-sectional tapering, wherein
      the thermally insulating material compensates for the cross-sectional tapering to provide a substantially constant outer diameter of the washer and to reduce a thermal conductivity of a heat-conducting path, formed via the washer, between the housing and the energy storage module.

2. The washer according to claim 1, wherein the thermally insulating material is a glass-fiber-reinforced thermoset.

3. The washer according to claim 1, wherein the washer is of hollow-cylindrical form.

4. The washer according to claim 1, wherein
   the metallic bushing has two plate-shaped end pieces, surfaces of which form the metallic axially opposite end faces and which are connected by way of the cross-sectional tapering, and
   the thermally insulating material is arranged between the two plate-shaped end pieces and surrounds the cross-sectional tapering.

5. The washer according to claim 1, wherein
   the metallic bushing has a double cone form at least in the region of the cross-sectional tapering.

6. An electrical energy store for a motor vehicle, comprising:
   at least one energy storage module;
   a housing for receiving the at least one energy storage module;
   at least one connector for providing a mechanical connection between metallic contact surfaces of the at least one energy storage module and of the housing; and
   at least one washer arranged between the energy storage module and the housing, the washer comprising:
   a metallic bushing for providing a current path between axially opposite abutment surfaces of the metallic bushing for pressing against the metallic contact surfaces of the energy storage module and the housing for potential equalization between the energy storage module and the housing, wherein
      metallic axially opposite end faces of said metallic bushing form the axially opposite abutment surfaces,
      the metallic bushing has, between the axially opposite end faces, a cross-sectional tapering, which tapering forms a fuse for interrupting a current path in an event of an overcurrent, and
      the metallic bushing has an axial hole for receiving the at least one connector of the mechanical connection; and
   a thermally insulating material surrounding the metallic bushing at least in a region of the cross-sectional tapering, wherein
      the thermally insulating material compensates for the cross-sectional tapering to provide a substantially constant outer diameter of the washer and to reduce a thermal conductivity of a heat-conducting path, formed via the washer, between the housing and the energy storage module.

7. The electrical energy store according to claim 6, wherein
   the metallic contact surface of the energy storage module is formed on a cell module frame for holding energy storage cells of the energy storage module.

8. An arrangement for a motor vehicle, comprising:
   a heat source of the motor vehicle;
   an electrical energy store, the electrical energy store comprising:
      at least one energy storage module;
      a housing for receiving the at least one energy storage module, wherein the heat source is configured to introduce heat into the housing;
      at least one connector for providing a mechanical connection between metallic contact surfaces of the at least one energy storage module and of the housing; and
      at least one washer arranged between the energy storage module and the housing, the washer comprising:
      a metallic bushing for providing a current path between axially opposite abutment surfaces of the metallic bushing for pressing against the metallic contact surfaces of the energy storage module and the housing for potential equalization between the energy storage module and the housing, wherein metallic axially opposite end faces of said metallic bushing form the axially opposite abutment surfaces, the metallic bushing has, between the axially opposite end faces, a cross-sectional tapering, which tapering forms a fuse for interrupting a current path in an event of an overcurrent, and the metallic bushing has an axial hole for receiving the at least one connector of the mechanical connection; and a thermally insulating material surrounding the metallic bushing at least in a region of the cross-sectional tapering, wherein the thermally insulating material compensates for the cross-sectional tapering to provide a substantially constant outer diameter of the washer and to reduce a thermal conductivity of a heat-conducting path, formed via the washer, between the housing and the energy storage module.

9. The arrangement according to claim 8, wherein the heat source is a pipe of an exhaust-gas system of the motor vehicle, and the housing has at least two adjacent housing regions between which the pipe runs.

10. A motor vehicle comprising an arrangement according to claim 8.

11. The motor vehicle according to claim 10, wherein the motor vehicle is a hybrid vehicle.

12. The motor vehicle arrangement according to claim 11, wherein the heat source is a pipe of an exhaust-gas system of the motor vehicle, and the housing has at least two adjacent housing regions between which the pipe runs.

* * * * *